United States Patent
Messmer

(10) Patent No.: US 6,646,558 B2
(45) Date of Patent: Nov. 11, 2003

(54) METHOD AND ARRANGEMENT FOR RECOGNIZING POTENTIAL OVERHEATING OF AN OBJECT

(75) Inventor: Helmut Messmer, Volkertshausen (DE)

(73) Assignee: Bodenseewerk Gerätechnik GmbH, Überlingen (DE)

( * ) Notice: Subject to any disclaimer, the term of this patent is extended or adjusted under 35 U.S.C. 154(b) by 182 days.

(21) Appl. No.: 09/841,663

(22) Filed: Apr. 24, 2001

(65) Prior Publication Data

US 2001/0035825 A1 Nov. 1, 2001

(30) Foreign Application Priority Data

Apr. 26, 2000 (DE) ......................................... 100 20 380

(51) Int. Cl.$^7$ .............................................. G08B 17/00
(52) U.S. Cl. ...................................... 340/588; 374/102
(58) Field of Search ............................... 340/588, 589, 340/963, 425.5, 584, 449; 219/490, 494, 506; 374/102, 107; 361/103

(56) References Cited

U.S. PATENT DOCUMENTS

| | | | |
|---|---|---|---|
| 3,775,745 A | * | 11/1973 | Kelley ........................ 340/449 |
| 4,460,893 A | | 7/1984 | Thomas et al. .............. 340/682 |
| 5,732,546 A | | 3/1998 | Pineo et al. ................ 60/39.03 |
| 5,788,148 A | * | 8/1998 | Burner et al. ................ 237/2 A |
| 5,946,181 A | * | 8/1999 | Gibson ........................ 361/103 |
| 6,091,322 A | * | 7/2000 | Ang et al. ................ 340/425.5 |

FOREIGN PATENT DOCUMENTS

| | | |
|---|---|---|
| EP | 660 282 | 6/1995 |
| FR | 2 321 117 | 3/1977 |
| GB | 693642 | 7/1953 |

* cited by examiner

Primary Examiner—Thomas Mullen
(74) Attorney, Agent, or Firm—Scully, Scott, Murphy & Presser

(57) ABSTRACT

The invention relates to a method and an arrangement for recognizing potential overheating of an object. For this purpose the temperature of the object is measured by means of temperature sensors. A signal processing arrangement determines the temperature gradient from the measured temperature values. A comparator compares the determined value of the temperature gradient with a threshold value generated by a threshold value generator. When the threshold value is exceeded, a warning signal generator triggers a warning signal. This warning signal can be an acoustical or optical signal. In addition or alternatively, the warning signal can activate a protective measure arrangement.

3 Claims, 3 Drawing Sheets

US 6,646,558 B2

METHOD AND ARRANGEMENT FOR RECOGNIZING POTENTIAL OVERHEATING OF AN OBJECT

BACKGROUND OF THE INVENTION

This invention relates to a method and an arrangement for recognizing potential overheating of an object.

Overheating of objects is a general problem caused e.g. by heat generation on the outside of the object (e.g. by fire) or by internal heat generation e.g. in machines, engines or components.

Examples of this are engines in operation, e.g. internal combustion engines or thrusters, which are operated with combustible liquids or gases. In such engines there is a potential risk of fire when they have defects. Particularly in the aviation technology it is, in the case of fire, very important to bring the fire under control as fast as possible and, thus, to prevent the engine from being destroyed. This can be effected e.g. by interrupting fuel supply in time. This interruption can be effected by hand by means of a fuel shut-off by an electromechanical valve.

Several methods or measures are known, which consider a possible overheating of an object. By one kind of methods or measures the object is protected from being overheated (i.e. overheating is prevented), e.g. by a fireproof casing or by cooling. By means of other kinds of methods or measures the possible overheating is recognized and suitable measures are then carried out, by which the overheating is prevented or the dangers caused by the overheating are eliminated or reduced. Such measures are e.g. interruption of the fuel supply to an engine in the case of fire or interruption of the power supply of a component.

SUMMARY OF THE INVENTION

In order to effectively react to overheating, it is favorable to recognize the risk of overheating in good time.

It is therefore an object of the present invention to provide an effective method and an effective arrangement for recognizing in good time a potential overheating of an object.

According to the invention, this object is achieved by a method for recognizing potential overheating of an object, by which method the temperature of the object is measured and temperature values of the object are determined. These temperature values are used to determine the temperature gradient. The thus calculated value of the temperature gradient is compared with a predetermined value. In dependence on this comparison of the determined value of the temperature gradient with the predetermined value, a warning signal is triggered.

According to the invention, this object is furthermore achieved by an arrangement for recognizing potential overheating of an object, the arrangement comprising at least one temperature sensor for measuring the temperature of the object. Signal processing means determine the temperature gradient from the temperature values measured by the at least one temperature sensor. Comparator means then compare the determined value of the temperature gradient with a predetermined value and output a comparator signal. In dependence on this comparator signal, warning signal generating means trigger a warning signal.

The invention is based on the idea that a potential overheating of an object can be recognized very early by making use of the temperature gradient. Then, the overheating can be recognized even before it actually appears. This can be done by comparing the determined temperature gradient with a threshold value which may be individually defined for the object in question. If this threshold value is exceeded it can be concluded that there is a risk of overheating of the object. Then, by an indicating of this exceeded value, suitable measures can be carried out.

This method and this arrangement according to the invention can e.g. be used for recognizing fire or as overheating protection of components.

In one aspect of the invention the method and the arrangement is applied to an engine having fuel supply, the protective measures consisting in interrupting the fuel supply.

Further objects and features of the invention will be apparent to a person skilled in the art from the following specification of a preferred embodiment when read in conjunction with the appended claims.

BRIEF DESCRIPTION OF THE DRAWING

The invention and its mode of operation will be more clearly understood from the following detailed description when read with the appended drawing in which.

Throughout the drawings, the same elements when shown in more than one figure are designated by the same reference numerals.

DESCRIPTION OF THE PREFERRED EMBODIMENT(S)

Figure 1:
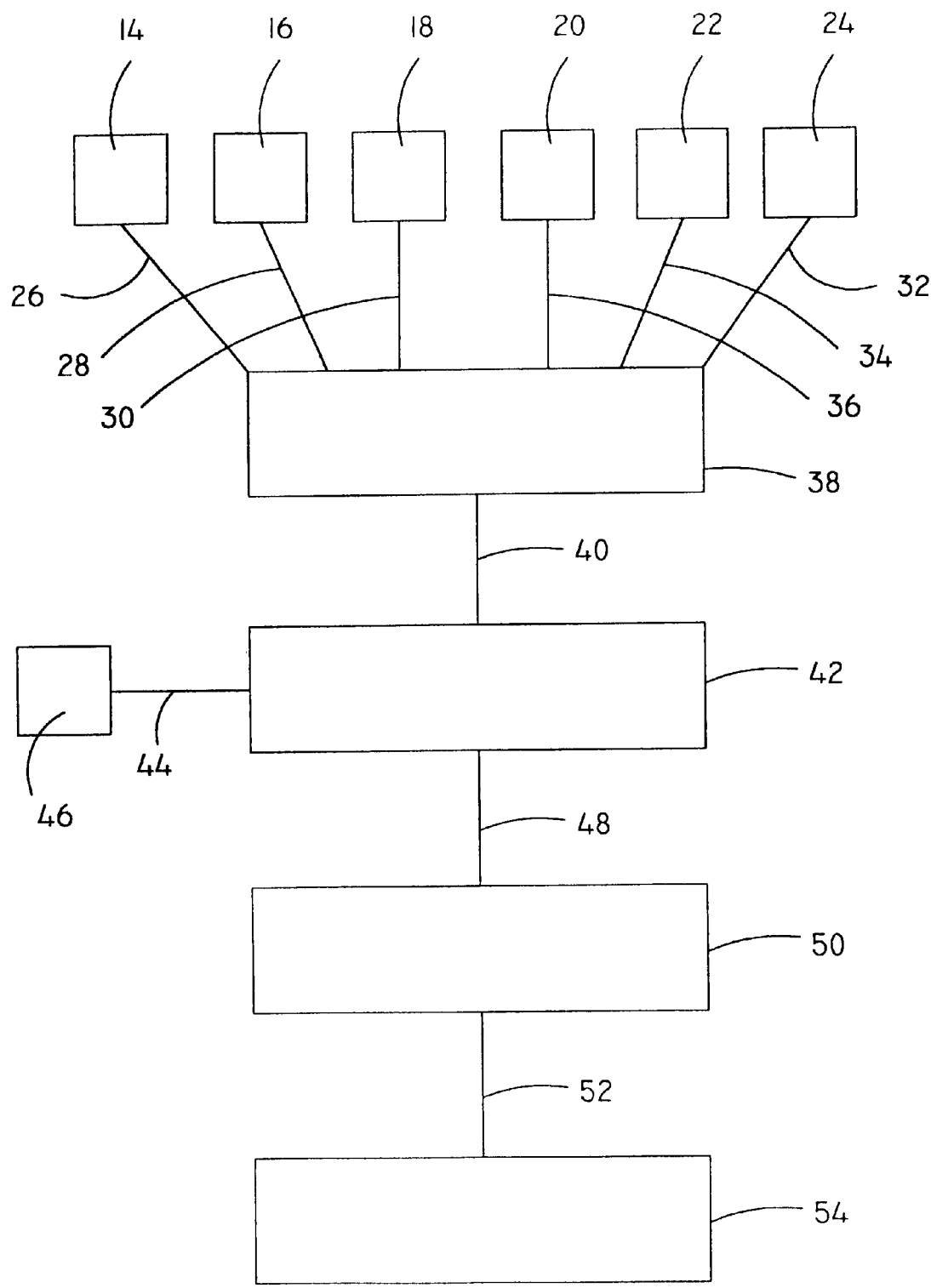
FIG. 1 is a block illustration and shows an arrangement for recognizing potential overheating of an object.
Figure 2:
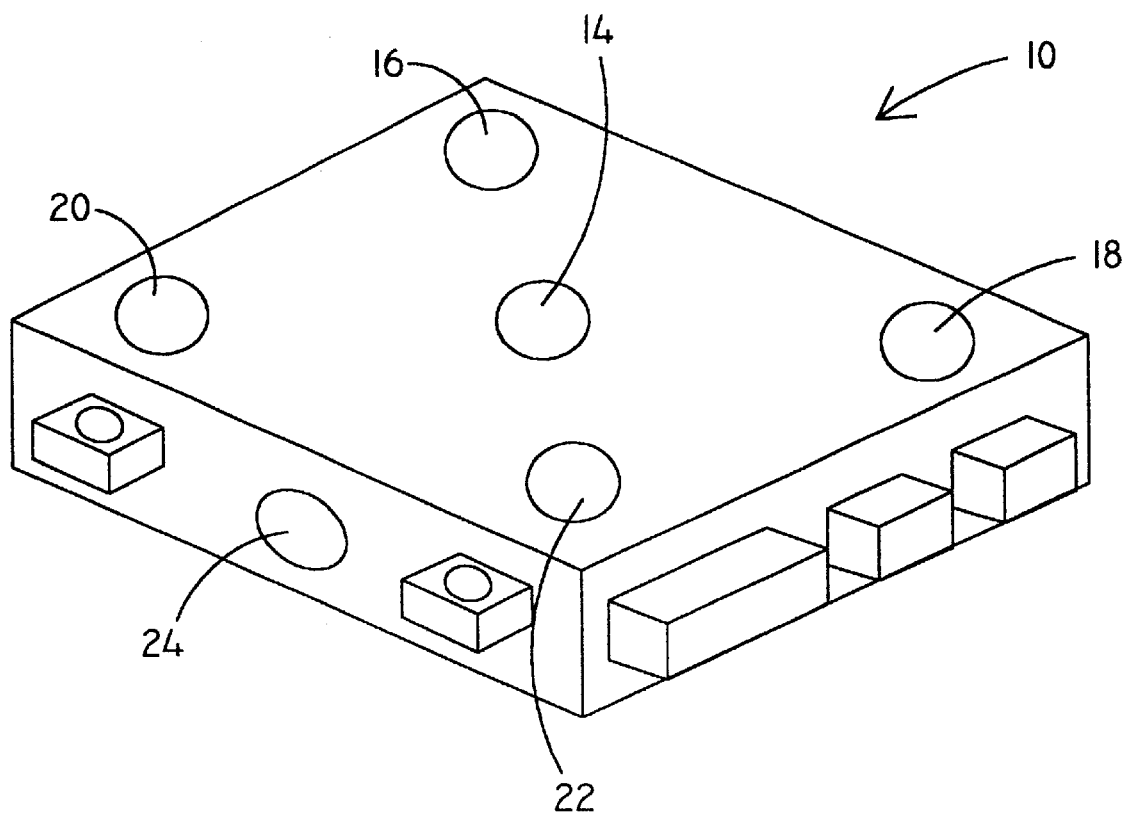
FIG. 2 is a schematic illustration and shows an electronic component accommodated in a housing and temperature sensors attached thereto.

In FIG. 1 there is shown a block illustration of an arrangement for recognizing potential overheating of a component 10 illustrated in FIG. 2, the overheating being caused e.g. by fire or by internal heat generation within the component 10. A first temperature sensor 14 is provided at a housing 12 of the component. Further temperature sensors 16, 18, 20, 22 and 24 can be provided at the housing 12.

The temperature sensors 14, 16, 18, 20, 22 and 24 are connected through lines 26, 28, 30, 32, 34 and 36, respectively, to a signal processing unit 38 for determining the temperature gradient from the temperature values obtained by means of one or more of the temperature sensors 14, 16, 18, 20, 22 and 24. The signal processing unit 38 is connected through a line 40 to a comparator 42. The comparator 42 is connected through a line 44 to a threshold value generator 46 and through a line 48 to a warning signal generator 50. The warning signal generator 50 can furthermore be connected through a line 52 to a protective measure arrangement 54 e.g. in the form of a switch for disconnecting the component from the power supply.

The described arrangement operates as follows:

The temperature of the component 10 is measured by one or more of the temperature sensors 14, 16, 18, 20, 22 and 24. The output (i.e. the determined temperature values) of the temperature sensors 14, 16, 18, 20, 22 and 24 is applied through the lines 26, 28, 30, 32, 34 and 36, respectively, to the signal processing unit 38. From the determined temperature values the temperature gradient is calculated in the signal processing unit 38. This calculated value is applied through the line 40 to the comparator 42. The comparator 42 furthermore receives through the line 44 a threshold value from the threshold value generator 46. The comparator 42 compares the calculated value of the temperature gradient with the threshold value and applies a comparator signal through the line 48 to the warning signal generator 50. If the calculated value of the temperature gradient is higher than the threshold value, the comparator signal triggers a warning signal in the warning signal generator 50. This warning signal can e.g. be an acoustical or optical signal, by means of which a person has his attention drawn to the fact that the component is in danger of being overheated. However, the warning signal can also be applied through the line 52 to the protective measure arrangement 54, by means of which a suitable protective measure then is realized. This protective measure can e.g. consist in actuating a switch which interrupts the power supply to the component 10.

Figure 3:
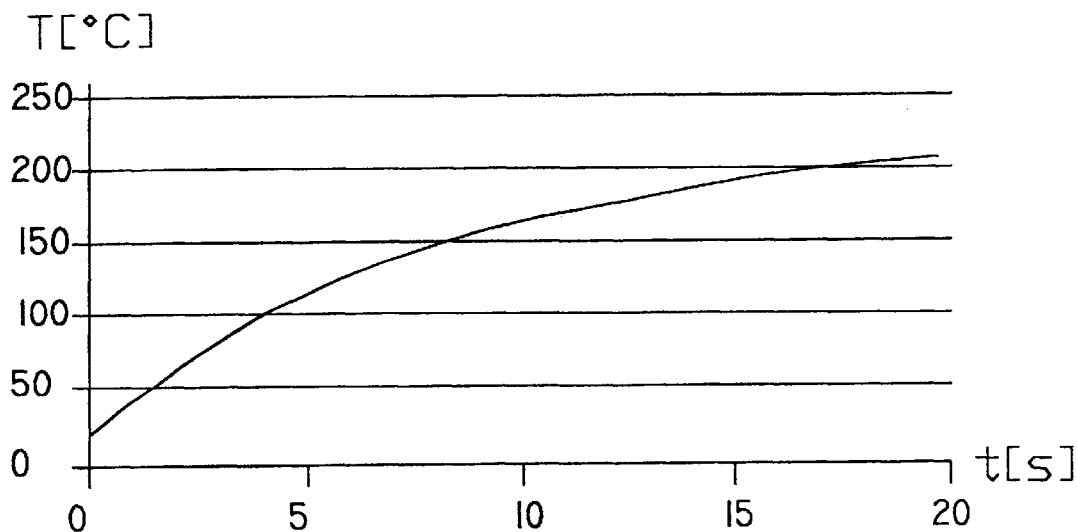
FIG. 3 is a diagram and shows the temperature as a function of time measured by means of the temperature sensors of FIG. 2 when the component of FIG. 2 is subject to fire.
Figure 4:
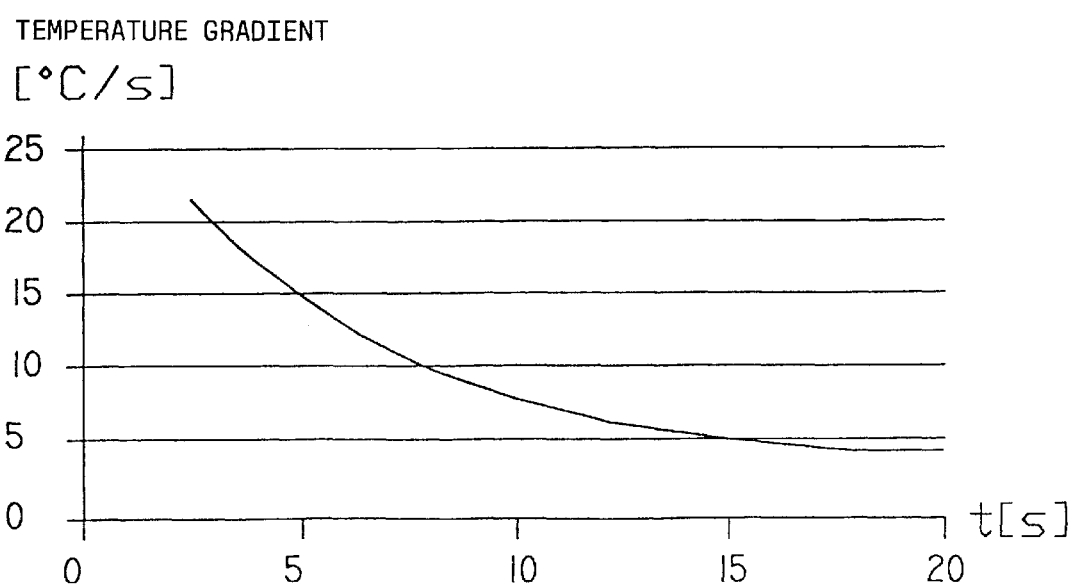
FIG. 4 is a diagram and shows the temperature gradient as a function of time determined by means of the arrangement of FIG. 1 from the sensing of temperature illustrated in FIG. 3.

FIG. 3 shows the temperature as a function of time, the temperature being measured by means of the temperature sensors 14, 16, 18, 20, 22 and 24 in an experiment in which the component 10 has been subject to fire. It can be seen that the rise of temperature is very high at the beginning and then decreases continuously. This course is even more clearly recognized in the diagram shown in FIG. 4, in which the temperature gradient is shown as a function of time. At the beginning the temperature gradient reaches values of 15–29° C./sec. and then falls to zero.

Having in mind that the temperature gradient during "normal" heating of a component is about 0.2° C./sec., it is obvious that this method is very effective. The threshold value can then be chosen to be in the range of 0.2° C./sec. to about 15° C./sec.

I claim:

1. A method for the early recognizing of a potential overheating of an object comprising an internal combination engine or thruster having a fuel supply, the method comprising the steps of:

measuring the temperature of said object and determining temperature values;

determining a temperature gradient from said temperature values;

comparing a value of said temperature gradient with a predetermined value;

triggering a warning signal in dependence upon said comparison of said determined value of the temperature gradient with said predetermined value; and interrupting said fuel supply in dependence of said triggered warning signal.

2. The method of claim 1, wherein said method is employed for recognizing an actual fire or a potential fire.

3. An arrangement for the early recognizing of a potential overheating of an object comprising an internal combustion engine or thruster having a fuel supply, comprising:

at least one temperature sensor for measuring the temperature of said object;

signal processing means for determining the temperature gradient from temperature values measured by said at least one temperature sensor;

comparator means for comparing a determined value of said temperature gradient with a predetermined value and for outputting a comparator signal;

warning signal generating means for triggering a warning signal in dependence upon said comparator signal; and interrupting means for interrupting said fuel supply in dependence upon said triggered warning signal.

* * * * *